(12) United States Patent
Hollander et al.

(10) Patent No.: US 7,933,731 B2
(45) Date of Patent: Apr. 26, 2011

(54) SMART SENSOR

(75) Inventors: Milton B. Hollander, Stamford, CT (US); Michael A. Macchiarelli, Jr., Shelton, CT (US)

(73) Assignee: Omega Engineering, Inc., Stamford, CT (US)

( * ) Notice: Subject to any disclaimer, the term of this patent is extended or adjusted under 35 U.S.C. 154(b) by 240 days.

(21) Appl. No.: 12/039,963

(22) Filed: Feb. 29, 2008

(65) Prior Publication Data

US 2009/0217755 A1 Sep. 3, 2009

(51) Int. Cl.
*G06F 19/00* (2006.01)

(52) U.S. Cl. .............................. 702/104; 73/1.01; 702/85

(58) Field of Classification Search .................. 73/1.01, 73/1.02, 1.08, 1.09, 1.11, 1.13, 1.15, 1.16, 73/1.22, 1.27, 1.28, 1.29, 1.31, 1.34, 1.35, 73/1.36, 1.37, 1.38, 1.41, 1.42, 1.43, 1.45, 73/1.46, 1.48, 1.49, 1.56, 1.57, 159, 1.61, 73/1.62, 1.73, 1.75, 1.76, 1.77, 1.79, 1.81, 73/1.82, 1.88; 702/1, 85, 86, 87, 88, 90, 702/92, 93, 94, 95, 96, 98, 99, 100, 101, 702/103, 104, 107, 127, 187, 189
See application file for complete search history.

(56) References Cited

U.S. PATENT DOCUMENTS

| | | | | | |
|---|---|---|---|---|---|
| 4,303,984 | A | * | 12/1981 | Houvig | 702/104 |
| 4,418,392 | A | * | 11/1983 | Hata | 702/91 |
| 4,831,558 | A | * | 5/1989 | Shoup et al. | 702/188 |
| 4,845,649 | A | * | 7/1989 | Eckardt et al. | 702/104 |
| 5,089,979 | A | * | 2/1992 | McEachern et al. | 702/91 |
| 5,347,476 | A | * | 9/1994 | McBean, Sr. | 702/91 |
| 5,365,462 | A | * | 11/1994 | McBean, Sr. | 702/91 |
| 5,375,073 | A | * | 12/1994 | McBean | 702/91 |
| 5,377,128 | A | * | 12/1994 | McBean | 702/91 |
| 5,790,432 | A | * | 8/1998 | Morys | 702/91 |
| 5,839,094 | A | * | 11/1998 | French | 702/91 |
| 5,946,641 | A | * | 8/1999 | Morys | 702/91 |
| 6,243,654 | B1 | * | 6/2001 | Johnson et al. | 702/85 |
| 6,427,129 | B1 | * | 7/2002 | Lalla | 702/88 |
| 6,622,067 | B1 | * | 9/2003 | Lovelace, II et al. | 701/19 |
| 6,633,784 | B1 | * | 10/2003 | Lovelace, II et al. | 700/65 |
| 7,366,624 | B2 | * | 4/2008 | Wobschall | 702/91 |
| 7,519,449 | B2 | * | 4/2009 | Rhee et al. | 700/182 |
| 2001/0013826 | A1 | | 8/2001 | Ahmed et al. | |
| 2003/0174068 | A1 | * | 9/2003 | Dobos et al. | 340/870.04 |
| 2005/0280408 | A1 | | 12/2005 | Wobschall | |
| 2006/0136170 | A1 | * | 6/2006 | Skinner | 702/150 |
| 2007/0187240 | A1 | * | 8/2007 | Araya et al. | 204/424 |

OTHER PUBLICATIONS

IEEE 1451.4, IEEE Standard for A Smart Transducer Interface for Sensors and Actuators—Mixed-Mode Communication Protocols and Transducer Electronic Data Sheet (TEDS) Formats, IEEE Instrumentation and Measurement Society, Dec. 15, 2004, IEEE, New York, NY.

* cited by examiner

*Primary Examiner* — Edward R Cosimano
(74) *Attorney, Agent, or Firm* — Perman & Green, LLP

(57) ABSTRACT

A measurement system includes a preexisting sensor, a transducer module installed in the pre-existing sensor including a memory storing information for identifying and operating the transducer, and a control device for communicating with the memory, the control device including a processor for automatically configuring the control device in response to data communicated from the memory and for collecting data from the pre-existing sensor. A method includes installing a transducer module into a preexisting sensor, and communicating between a memory of the transducer and a control device to automatically configure the control device in response to information for identifying and operating the transducer stored in the memory, and for collecting data from the pre-existing sensor.

2 Claims, 12 Drawing Sheets

SMART SENSOR

BACKGROUND

The exemplary embodiments generally relate to sensors and, more particularly, to wireless sensor communication.

A "smart sensor" is generally defined as a sensor with additional functionality in addition to the traditional capability of providing a signal representing detected physical phenomena. A smart sensor may include an automatic identification and calibration capability which would simplify interfacing the sensor to other equipment for data collection.

It would be advantageous to utilize smart sensor capabilities with pre-existing sensors.

SUMMARY

In one exemplary embodiment, a measurement system includes a preexisting sensor, a transducer module installed in the pre-existing sensor including a memory storing information for identifying and operating the transducer, and a control device for communicating with the memory, the control device including a processor for automatically configuring the control device in response to data communicated from the memory and for collecting data from the pre-existing sensor.

In another exemplary embodiment, a method includes installing a transducer module into a preexisting sensor, and communicating between a memory of the transducer and a control device to automatically configure the control device in response to information for identifying and operating the transducer stored in the memory, and for collecting data from the pre-existing sensor.

BRIEF DESCRIPTION OF THE DRAWINGS

The foregoing aspects and other features of the disclosed embodiments are explained in the following description, taken in connection with the accompanying drawings, wherein.

DETAILED DESCRIPTION OF THE EXEMPLARY EMBODIMENTS

Figure 1:
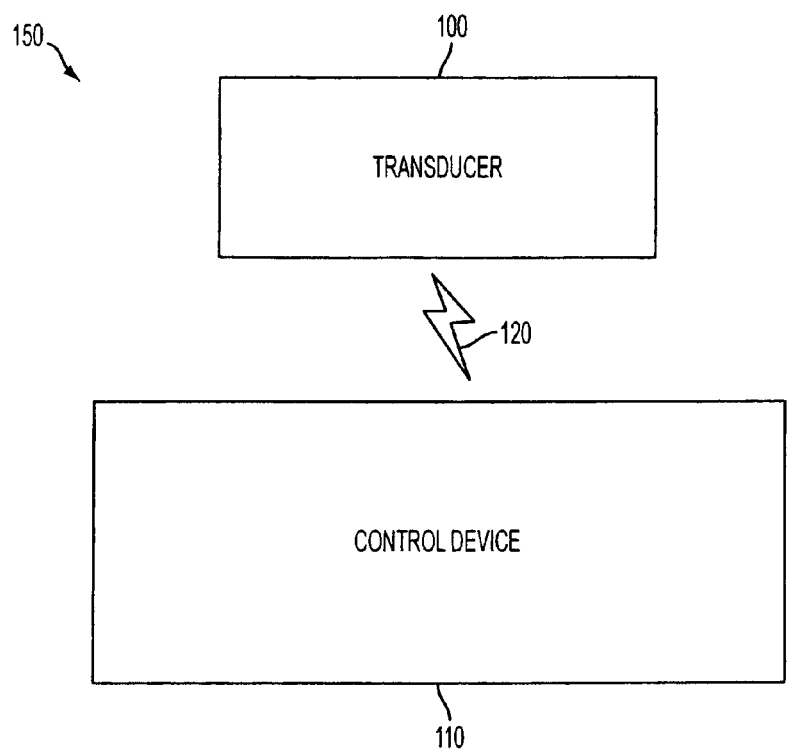
FIG. 1 illustrates a sensor system according to the exemplary embodiments.

FIG. 1 illustrates a measurement system 150 in accordance with an exemplary embodiment. Although the embodiments disclosed will be described with reference to the embodiments shown in the drawings, it should be understood that the embodiments disclosed can be embodied in many alternate forms of embodiments. In addition, any suitable size, shape or type of elements or materials could be used.

The exemplary embodiments may provide wireless communication between any suitable transducer module and a control device, although in alternate embodiments the transducer module and the control device may communicate through wired connections. The transducer module may be configured to transmit transducer data, automatically or in response to a user input, to the control device. The transducer data may allow for the calibration of the control device and/or the transducer itself with respect to the operating parameters of the transducer in a plug and play manner.

As can be seen in FIG. 1, the system includes at least one transducer module 100, at least one control device 110 and a communication system 120 for transferring data between the transducer module 100 and the control device 110. Communication system 120 may include a wired or wireless communication system. The transducer module 100 may include any suitable transducer capable of obtaining data from, for example, any suitable environment. For example, the transducer module 100 may be one or more of a thermocouple, pressure sensor, light meter, radiation detector, force transducers, electrical (e.g. current, voltage, etc.) sensors and acoustic sensors. It is noted while only a few examples of suitable transducer modules are listed above, the type of transducer module is not limited to the types mentioned above.

Figure 2A:
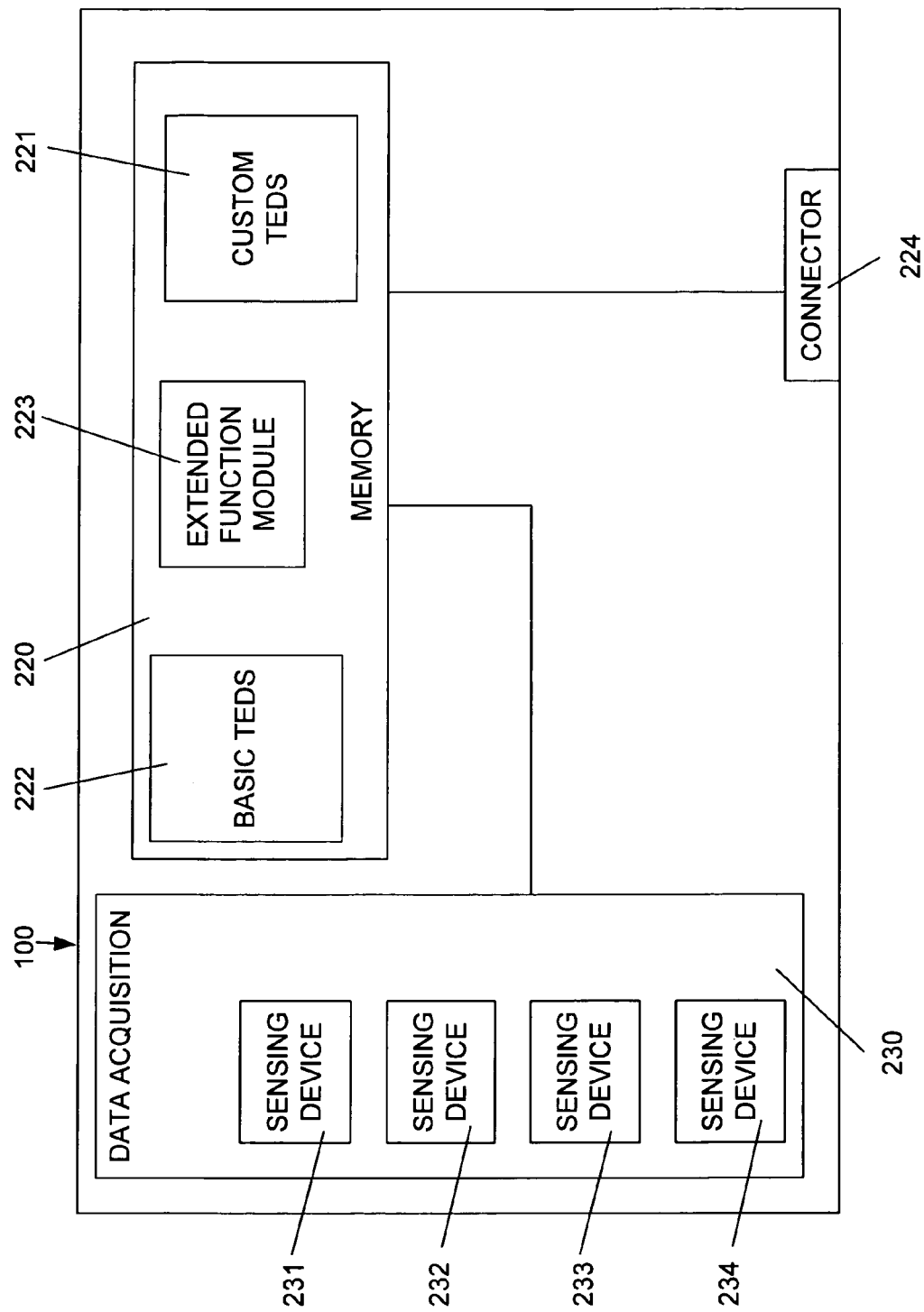
FIGS. 2A-2H show block diagrams of exemplary transducer modules.

FIG. 2A shows an exemplary embodiment of transducer module 100. Transducer module 100 may include a memory 220 connected to one or more data acquisition modules 230.

The data acquisition module 230 may include one or more sensing devices 231-234 for collecting data from any suitable environment. In this example, the data acquisition module may be described as a temperature sensor such that transducer module 100 may operate to record temperature. In alternate embodiments, the data acquisition module 230 may include multiple sensing devices. For example, device 231 may be a temperature probe, device 232 may be a pressure probe and so on. The transducer module 100 may be configured so that each of the sensing devices 231-234 in the data acquisition module 230 is a node (e.g. an addressable device) when communicating with the control device 110 (FIG. 1). The data acquisition module 230 may include circuitry for providing data collected by the sensing devices 231-234 to the memory 220.

The memory 220 may be any suitable memory for storing information for identifying and operating the transducer. For example, the memory may include any suitable non-volatile and/or volatile memory. The memory may also be configured to store the data recorded by the sensing devices 231-234 of data acquisition module 230. In this example, the memory includes a basic TEDS (transducer electronic data sheet) module 222 and a custom TEDS module 221. The basic TEDS module 222 may include, but is not limited to, information regarding an identity of the transducer 100. For example, the basic TEDS module 222 may include a manufacturer identification, model number, version letter, version number and serial number of the transducer 100. The identification data may be organized in, for example, a format (e.g. template) as described in Institute of Electrical and Electronics Engineers, Inc. Standard 1451.4™ ("IEEE 1451"), the disclosure of which is incorporated herein by reference in its entirety. In alternate embodiments the identification data may be organized in any suitable format. Where the basic TEDS module 222 is associated with more than one sensing device (e.g. sensing devices 231-234) the memory may include a list having identification information for each of the sensing devices 231-234, also referred to as a node list. It is noted that the sensing devices 231-234 may be modular sensing devices that are removably coupled to the transducer 100. The memory 220 may also include a custom TEDS module 221. The custom TEDS module 221 may include the information in the basic TEDS module 222 and any other suitable sensor related information as defined by a manufacturer or user of the transducer module 100.

The memory 220 may also include an extended function module 223 that may include sensor configuration data including, but not limited to, calibration parameters, gains and filter settings. The extended function module 223 includes data that may directly control the data acquisition module 230 and/or associated properties as a function of the transducer function register (FR), which may also be included in the memory 220. The function register may be a binary register of length equal to the total number of bits associated with hardware switches or function bits defined by a family code and ranked by the node list. The function register may include a current operational state of the transducer module 100, its data acquisition module 230, and sensing devices 231-234. The family code may be part of the unique registration number for the transducer module 100, which may be used to identify transducer functions and specific communication commands for the sensing devices 231-234.

In this embodiment, the transducer module 100 may operate to store data from the data acquisition module 230 until connected to control device 110 through communication system 120. Memory 220 may be coupled to a connector 224 or other suitable interface for connection to communication system 120 (FIG. 1).

Figure 2B:
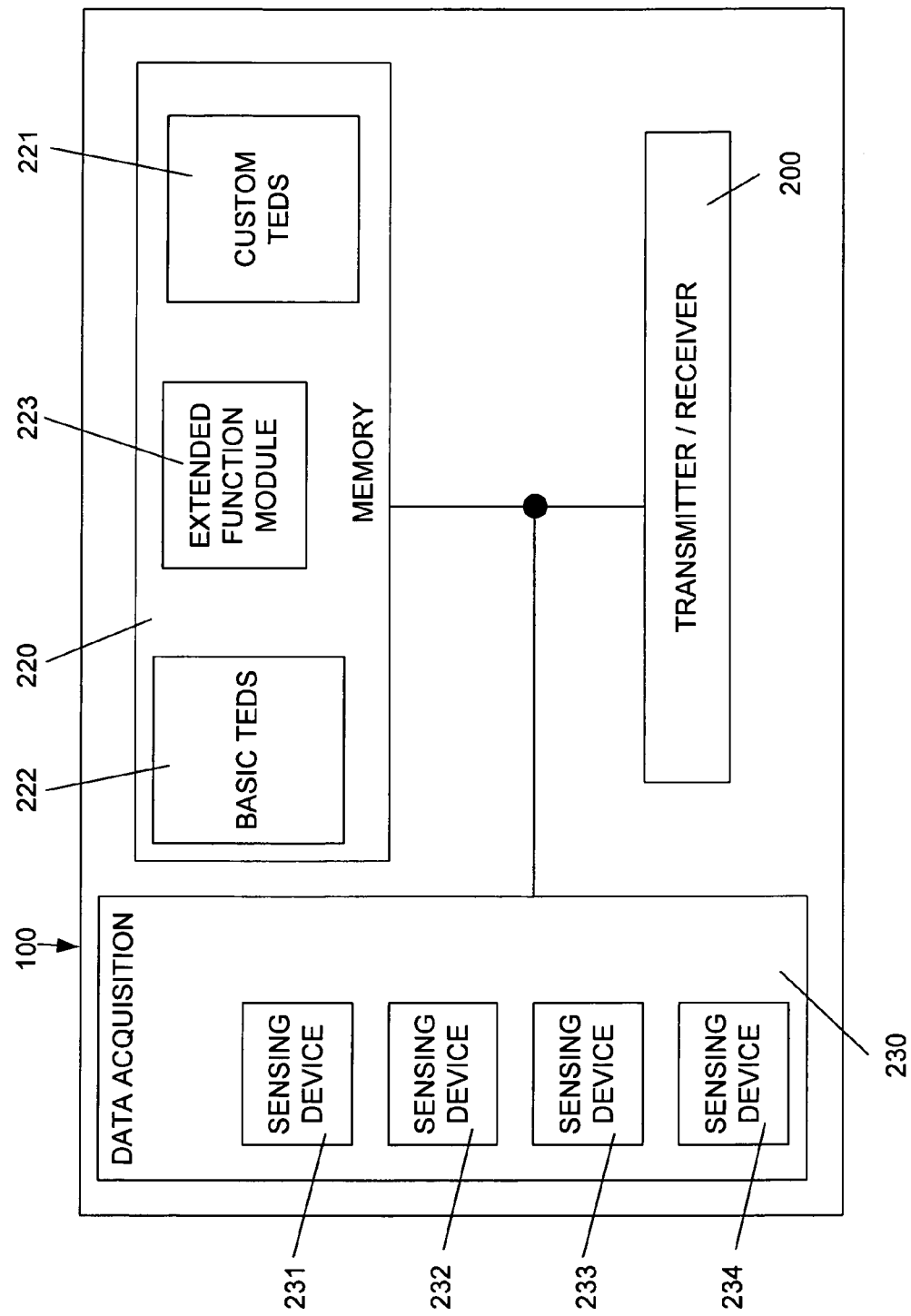

Referring to FIG. 2B, in another embodiment, in addition to data acquisition module 230 and memory 220, transducer module 100 may include a transmitter/receiver 200 (individually or collectively referred to as a communication module for explanation purposes).

The communication module 200 may be a wireless communication module and may be configured to transmit and receive data over any suitable communication protocol such as, for example, a mixed mode interface (MMI), for example as defined in IEEE 1451. In alternate embodiments the MMI protocol may be integrated with short or long range wireless communications including, but not limited to, cellular, Bluetooth®, radio frequency (RF), infrared (IR), and Zigbee® protocols. The MMI protocol is a master-slave, multidrop, serial data protocol. The MMI protocol may allow power to be supplied to and data transfer to and from one or more transducer modules 100 by, for example, control device 110 (FIG. 1). The data transfer may include, for example, both analog and digital signal transmissions. In alternate embodiments, the data transfer may be digital or analog.

Figure 2C:
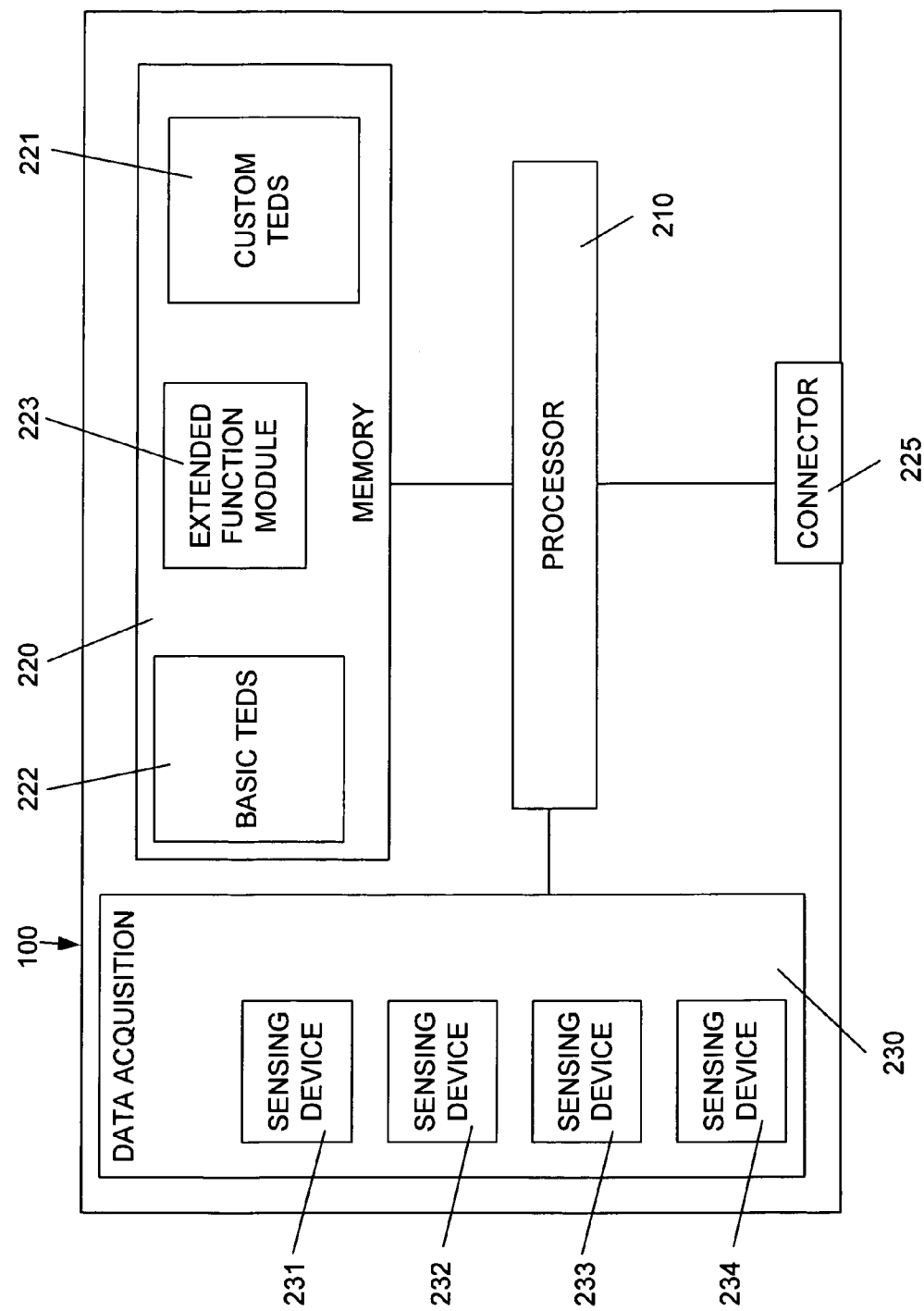

FIG. 2C shows an exemplary embodiment of transducer module 100 that includes data acquisition module 230, memory 220, and a processor 210. The processor 210 may be any suitable processor for carrying out the functions of the transducer 100 as described herein. In alternate embodiments the processor 210 may include a suitable bus that may be managed by the control module 110. The processor 210 may operate to control the data acquisition module 230 and the memory 220. In addition, the processor 210 may be configured to read identification information and data collected from each of the sensing devices 231-234, and compile the identification information and collected data in memory 220. In some embodiments, the processor 210 may compile the identification information in the basic TEDS module 222. The processor 210 may also operate as an interface between the data acquisition module 230, the memory 220 and the communication system 120 (FIG. 1). The processor 210 may be coupled to a connector 225 or other suitable interface for connection to communication system 120 (FIG. 1).

Figure 2D:
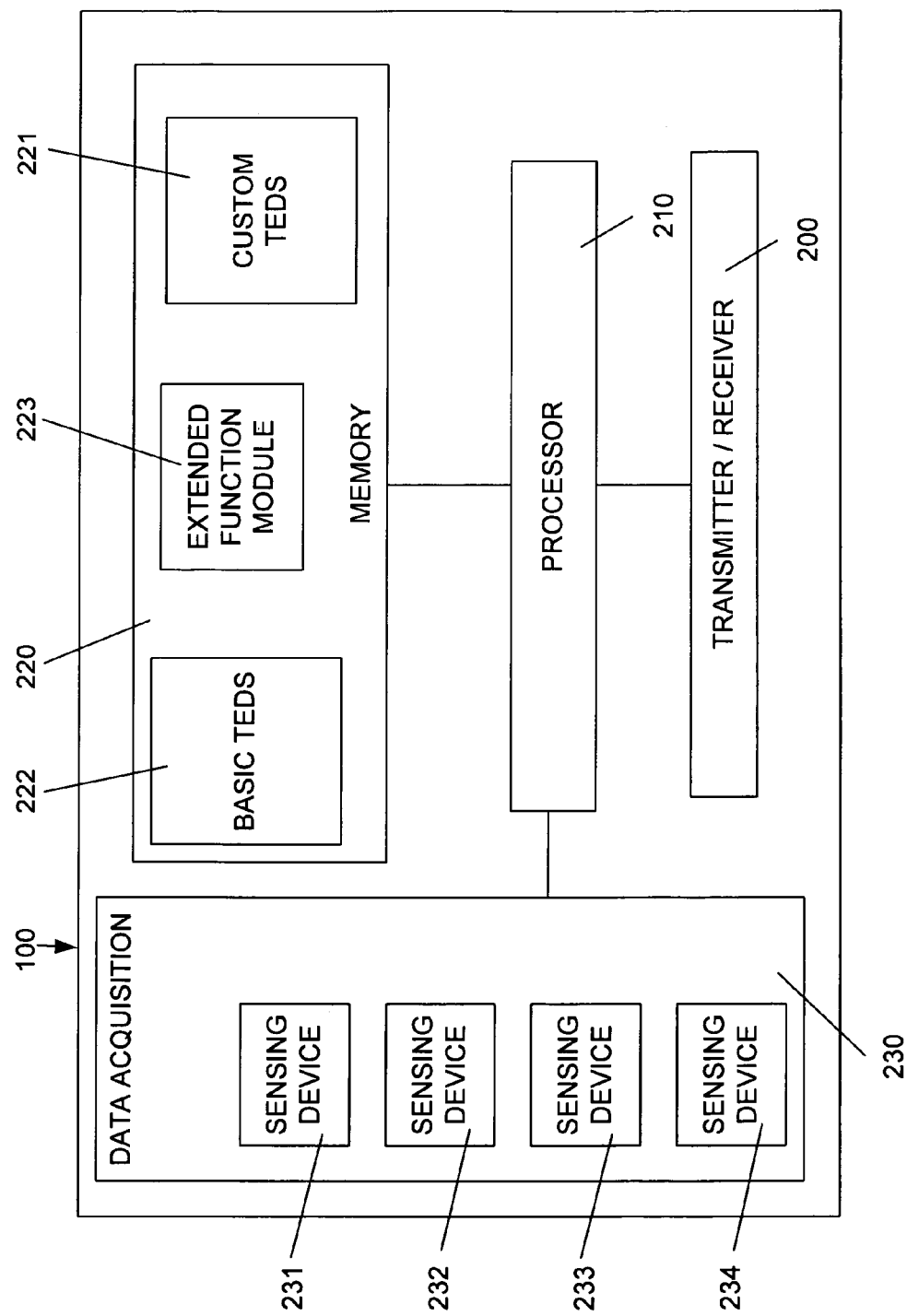

In FIG. 2D, transducer module 100 includes data acquisition module 230, memory 220, processor 210 and transmitter/receiver communication module 200. In this embodiment, the processor 210 may operate to control the data acquisition module 230 and the memory 220, and may also operate as an interface between the data acquisition module 230, the memory 220 and the transmitter/receiver communication module 200. The transmitter/receiver communication module 200 may provide wireless communication between the transducer module and communication system 120 (FIG. 1).

Figure 2E:
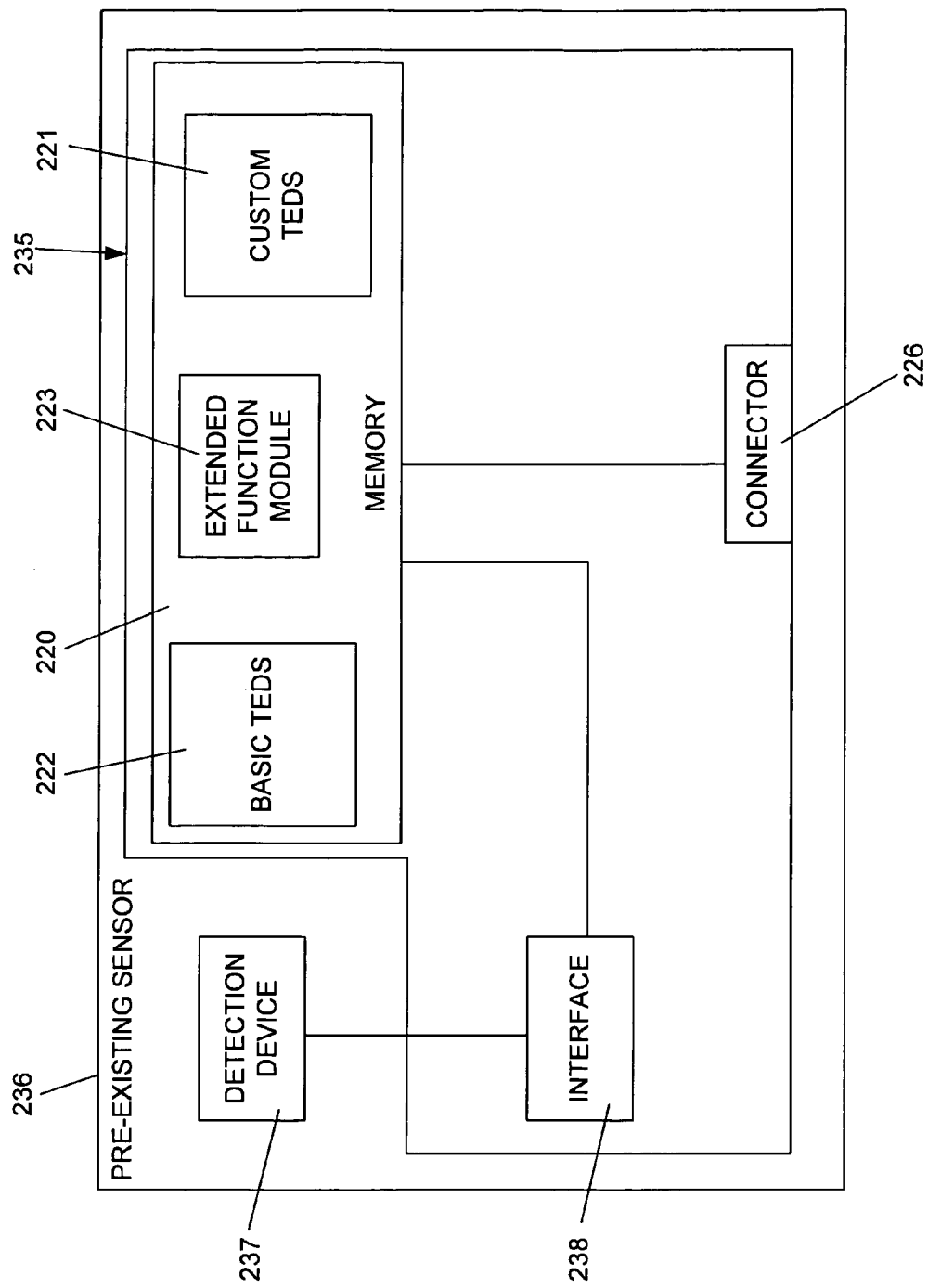

FIG. 2E shows an embodiment where a transducer module 235, similar to the module shown in FIG. 2A, may be installed in a pre-existing sensor 236. Transducer module 235 may include all the components and capabilities of the transducer module 100 shown in FIG. 2A except for data acquisition module 230. Pre-existing sensor 236 may be any suitable sensor or combination of sensors, for example, a thermocouple, pressure sensor, light meter, radiation detector, force transducer, electrical (e.g. current, voltage, etc.) sensor, or acoustic sensor, and may include one or more detection devices 237 according to the type of sensor. In at least one embodiment, the pre-existing sensor 236 may include a thermocouple connector. In this embodiment, transducer module 235 may also include an interface 238 for providing suitable signals between the detection device 237 and the transducer module 235. In this embodiment, memory 220 may be coupled to a connector 226 or other suitable interface for connection to communication system 120 (FIG. 1)

Figure 2F:
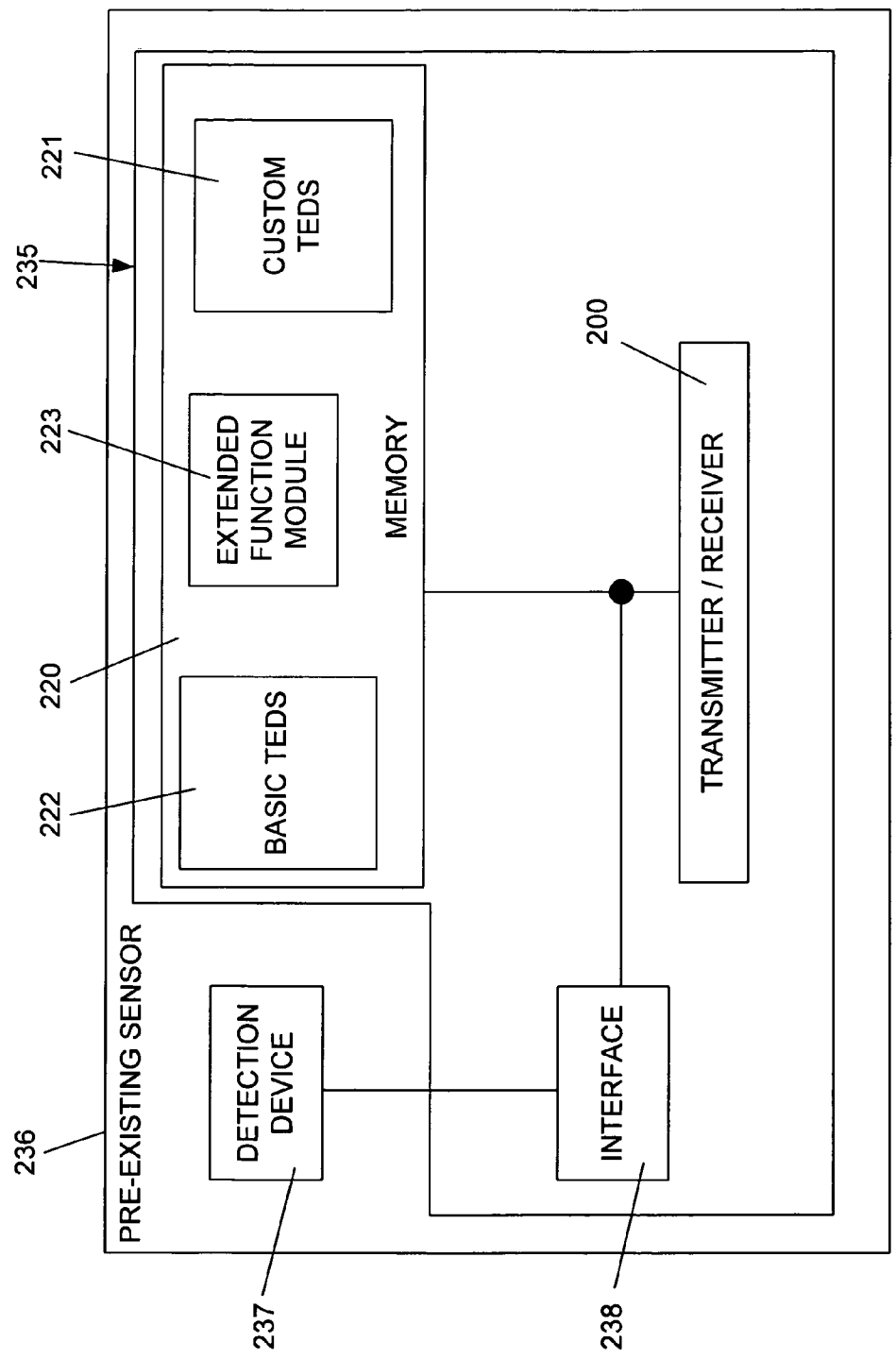
Figure 2G:
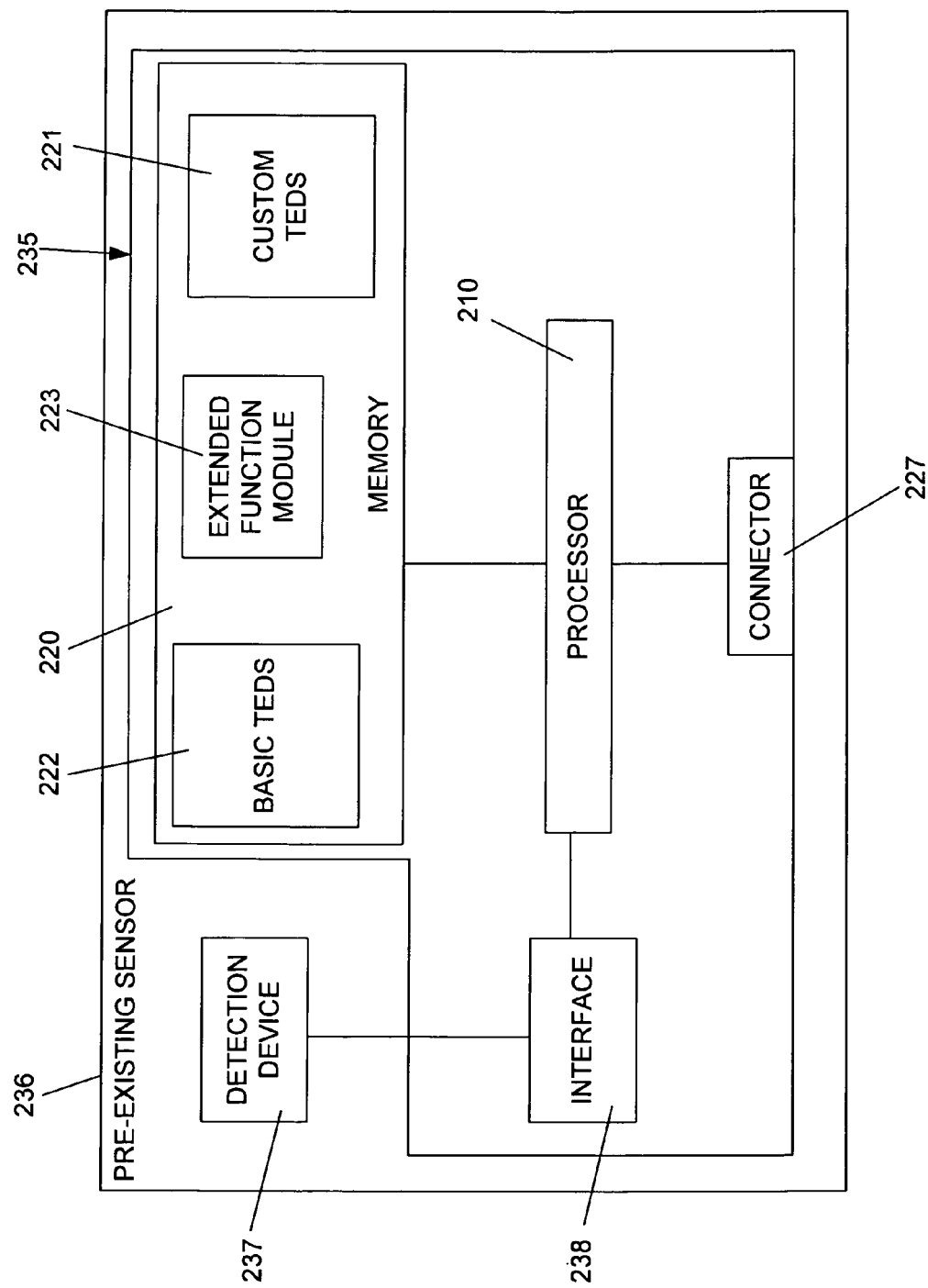
Figure 2H:
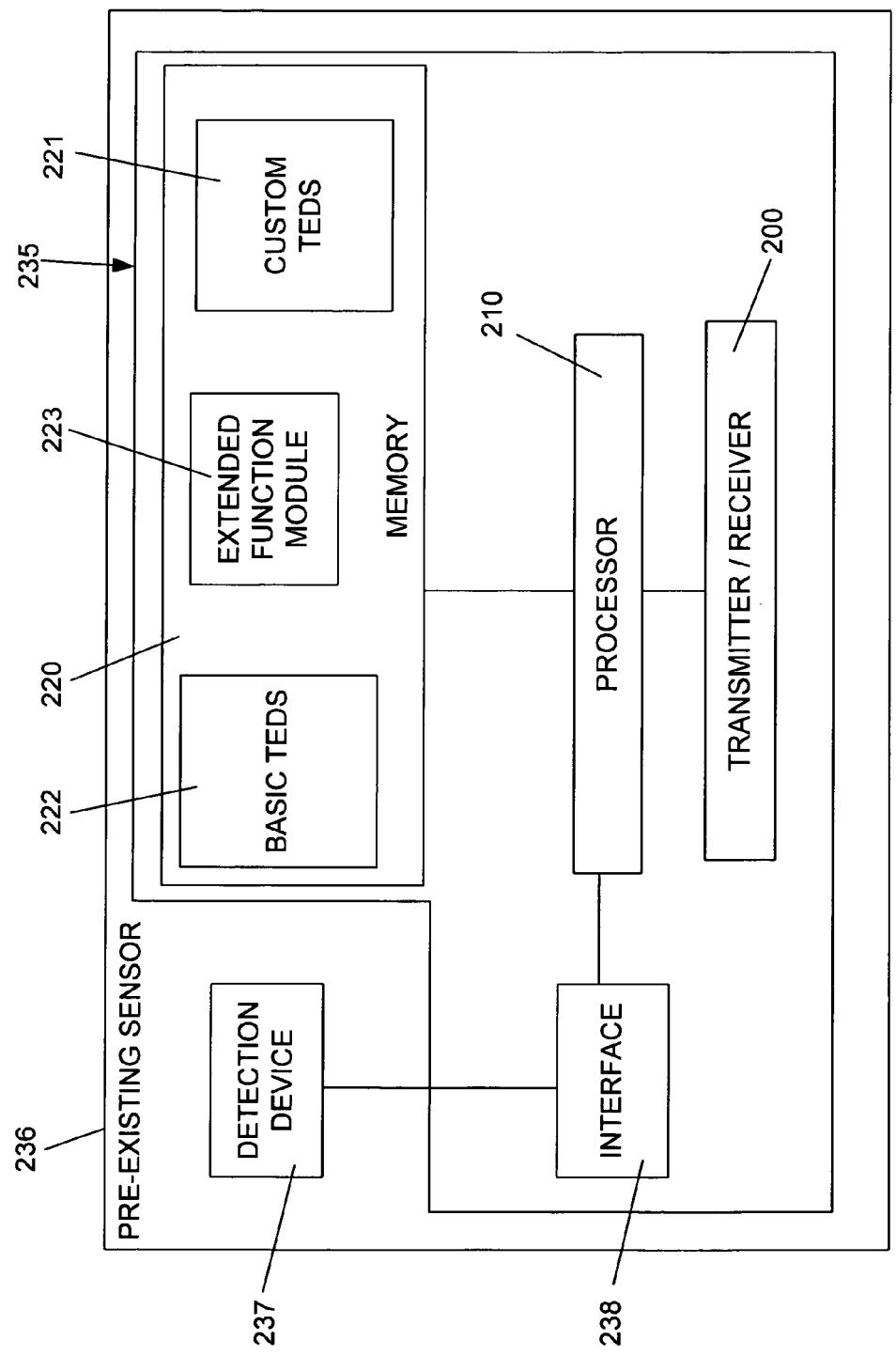

FIGS. 2F-2H show additional embodiments similar to those of FIGS. 2B-2D, respectively, where a transducer module 235 may be installed in a pre-existing sensor 236. Each of the embodiments of FIGS. 2F-2H, respectively, may include all the components and capabilities of the transducer module 100 shown in FIGS. 2B-2D, respectively, except for data acquisition module 230. In the embodiment of FIG. 2G, memory 220 may be coupled to a connector 227 or other suitable interface for connection to communication system 120 (FIG. 1).

Figure 3A:
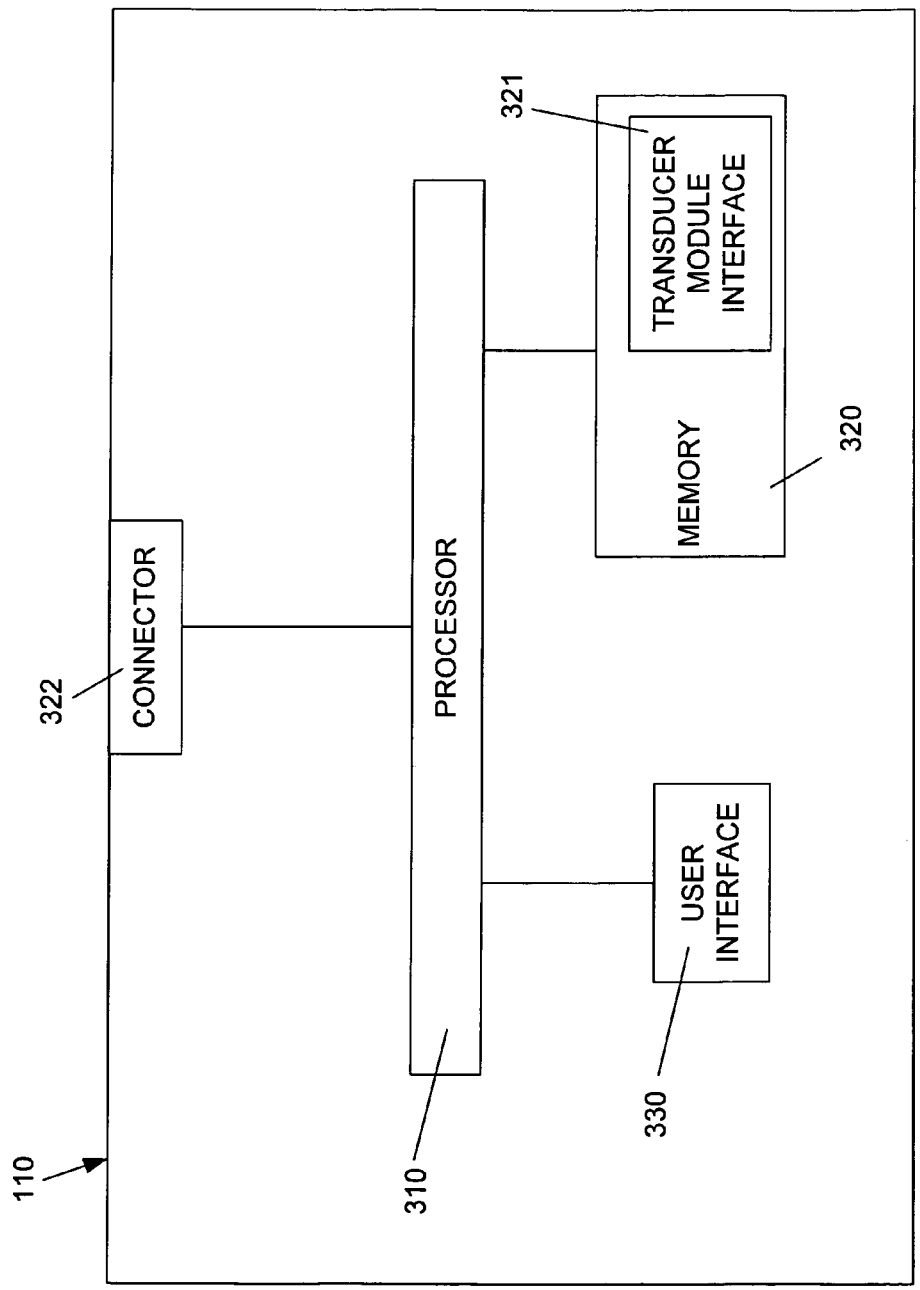
FIGS. 3A and 3B show a block diagrams of control devices for communicating with the transducer modules.

FIG. 3A shows an exemplary control device 110 that may provide a wired interface to transducer module 100 (FIGS. 1-2D), 235 (FIGS. 2E-2H). Control device 110 may be any suitable device for controlling, configuring and/or monitoring the transducer module 100, 235. For exemplary purposes only, in one embodiment the control device 110 may be a meter or a data acquisition board. The control device 110 includes a processor 310, a memory 320 and a user interface 330. The processor 310 may be connected to transducer module 100, 235 through a connector 322.

Figure 3B:
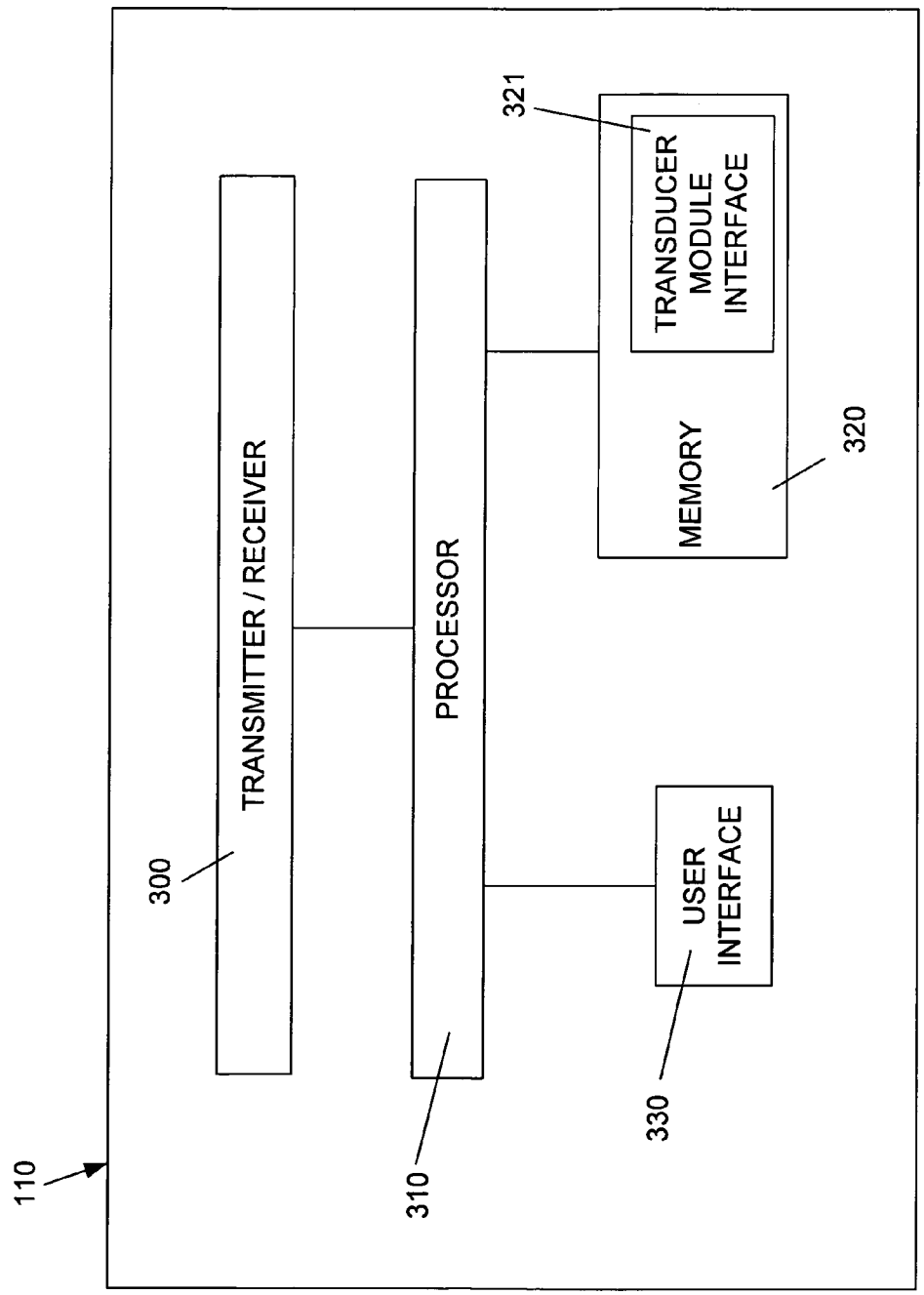

FIG. 3B shows an exemplary control device 110 that may provide a wireless interface to transducer module 100 (FIGS. 1-2D), 235 (FIGS. 2E-2H). In this embodiment, control device 110 includes a transmitter and/or receiver 300 (individually and collectively referred to herein as a communication module), a processor 310, a memory 320 and a user interface 330. The communication module 300 may be substantially similar to communication module 200 described above with respect to FIGS. 2B, 2D, 2F and 2H. The communication module 300 of the control device 110 may be configured to communicate with the communication device 200 of the transducer module 100, 235 according to the MMI transmission protocol described above. In alternate embodiments communication between the communication modules 200, 300 can occur over any suitable communication protocol.

Referring to FIGS. 3A and 3B, the processor 310 of the control device may be any suitable processor for carrying out the functions and operations of the control device 110 as describe herein. The memory 320 may be any suitable memory for storing, for example, calibration parameters for one or more transducer modules 100 (FIGS. 1-2D), 235 (FIGS. 2E-2H), any data from memory 220, TEDS data obtained from the transducer module 100, 235, control applications and/or any other suitable information. In one example, the memory 320 includes a transducer module interface 321 that may provide an interface between one or more transducer modules 100, 235 and application software stored in the memory 320. Examples of a suitable interface and application may include those described in IEEE 1451. In one example, the application software may be any suitable software for allowing control of the transducer module 100, 235 through the user interface 330. In other examples, the application software may be any suitable software for operating the control device 110 and/or the transducer module 100, 235. It is noted that in one example the transducer module interface 321 may be located in the memory 320 as shown in FIGS. 3A and 3B. In other examples the control device 110 may be connected to a network through a network interface such that the transducer module interface 321 is located in a location that is remote from the control device 110. Where transducer module interface 321 is located remotely from the control device 110, the control device may be configured as an interface between a remotely located control station (including the transducer module interface 321) and the transducer module 100, 235. The transducer module interface 321 may be configured to, for example, configure and manage the MMI; configure and manage one or more transducer modules 100, 235 and their associated transducer communication channels; and extracting and encoding TEDS data. The transducer module interface 321 may expose the transducer module communication channels as network accessible objects.

The user interface may be any suitable user interface including, but not limited to, graphical user interfaces. The user interface 330 may include a display, keyboard, mouse or other pointing device, touch enabled screen, a keypad, or any other suitable devices allowing a user to, for example, input data into the control device 110 for manipulating the transducer module 100, 235. The user interface 330 may also be configured to present data from the transducer module 100, 235 to the user.

Figure 4:
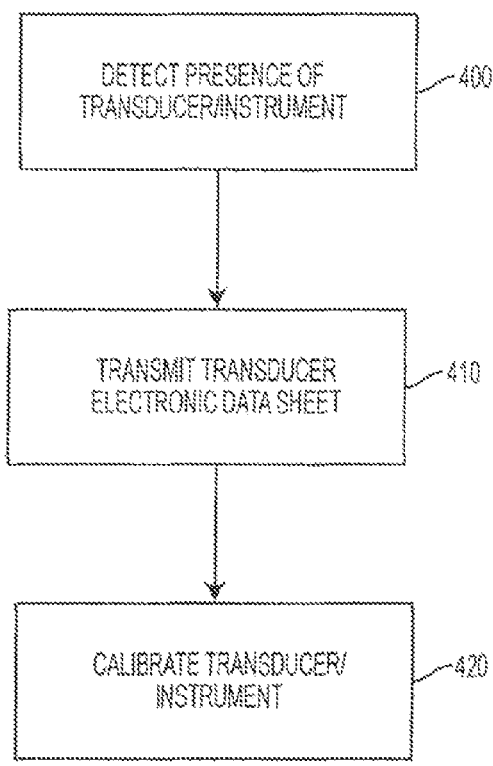
FIG. 4 shows a flow diagram of the communication between the transducer modules and the control device.

Referring now to FIG. 4, communication between the transducer module 100 (FIGS. 1-2D), 235 (FIGS. 2E-2H) and the control device will now be described. In this example the transducer module 100, 235 is referred to as a thermocouple, but in other examples the transducer module may include any suitable sensing device. In this example, the control device 110 (FIGS. 1, 3A and 3B) may automatically broadcast a detection signal that can be detected by the thermocouple 100. In alternate embodiments the detection signal may be broadcast upon request by a user. The broadcast signal may be any suitable strength to allow the thermocouple 100 to detect the control device 110 when the thermocouple is within a predetermined proximity to the control device 110. For example, the strength of the detection signal may depend on a predetermined distance surrounding the control device 110 so that the thermocouple 100 and/or control device may only communicate when the thermocouple 100 is within the predetermined distance. In alternate embodiments, the thermocouple 100 may broadcast the detection signal to the control device 110 in a manner substantially similar to that described above. In another example, the detection signal may be sufficient to allow communication between the thermocouple 100 and control device 110 when the thermocouple 100 is substantially contacting the control device where a minimized space may exist between the thermocouple 100 and the control device 110.

Upon detection of the broadcast detection signal (FIG. 4, Block 400), communications between the thermocouple 100 and the control device 110 may be switched to a digital mode to allow for reading the TEDS data in a bit format. The control device 110 may be configured to run data tests on the thermocouple 100 to determine the size and structure of the thermocouple memory 220, a unique serial number of the thermocouple 100 and a CRC code. Examples of suitable data tests may be found in IEEE 1451. After the control device 110 performs a data integrity check on the transducer module 100, 235, the TEDS data 222, 221 may be automatically transferred from the thermocouple to the control device 110 (FIG. 4, Block 410). In alternate embodiments the control device 110 may prompt the user to verify the transfer of the TEDS data through, for example, the user interface 330. During the data transfer, data from each sensing device 231-234 may be read and examined to determine the contents of a node list. The control device 110 may record the unique registration number of the thermocouple (and all of its sensing devices) in a node list stored in, for example, memory 320 of the control device 110

The memory 320 of the control device 110 may include calibration data for thermocouple 100. For example, control device 110 may include a table associating calibration data for multiple unique registration numbers. As each unique registration number is read by the control device 110, the control device 100 may transfer the corresponding calibration data to the node corresponding to the respective unique registration number. It is noted that in one example the user may input certain parameters such as ambient temperature, humidity, gain values, filter values and the like so that the processor 310 of the control device 110 may interpolate calibration data from a set of common calibration data. In other examples the control device 110 may be equipped with sensors for calculating base-line conditions for determining the calibration data for one or more transducer modules such as, for example, the thermocouple 100.

Upon completion of testing and calibration, the transducer module 100, 235 may proceed to provide data collected from sensing devices 231-234 or detection devices 237 to the control device 110 (FIG. 4, Block 420).

It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A measurement system comprising:
 a preexisting sensor;
 a transducer module installed in the pre-existing sensor, the transducer module including a first memory storing information for identifying and operating the transducer; and
 a control device for communicating with the first memory, the control device including a second memory and a processor for automatically configuring the control device in response to data communicated from the first memory and for collecting data from the pre-existing sensor; wherein the processor is further configured to transfer calibration data from the second memory to the first memory based on the information for identifying and operating the transducer from the first memory.

2. A method comprising:
 installing a transducer module into a preexisting sensor;
 communicating between a first memory of the transducer module and a control device to automatically configure the control device in response to information for identifying and operating the transducer stored in the first memory, and for collecting data from the pre-existing sensor, where the control device transfers calibration data from a second memory of the control device to the first memory based on the information from the first memory.

* * * * *